(12) United States Patent
Chapla et al.

(10) Patent No.: US 12,054,980 B2
(45) Date of Patent: Aug. 6, 2024

(54) PANEL ASSEMBLY WITH MULLION JOINT

(71) Applicant: Raytheon Company, Waltham, MA (US)

(72) Inventors: Kevin M. Chapla, Melissa, TX (US); Catherine Trent, Allen, TX (US)

(73) Assignee: RAYTHEON COMPANY, Waltham, MA (US)

( * ) Notice: Subject to any disclaimer, the term of this patent is extended or adjusted under 35 U.S.C. 154(b) by 215 days.

(21) Appl. No.: 17/698,981

(22) Filed: Mar. 18, 2022

(65) Prior Publication Data

US 2023/0295978 A1 Sep. 21, 2023

(51) Int. Cl.
*B64C 1/14* (2006.01)
*E06B 1/36* (2006.01)

(52) U.S. Cl.
CPC ............ *E06B 1/363* (2013.01); *B64C 1/1492* (2013.01)

(58) Field of Classification Search
CPC ..... B64C 1/1492; B64C 1/1484; E06B 1/363; E06B 1/366; E06B 1/26; E06B 1/362; E06B 1/48; E06B 1/486
USPC .................................. 244/129.3; 52/71, 201
See application file for complete search history.

(56) References Cited

U.S. PATENT DOCUMENTS

| | | | | |
|---|---|---|---|---|
| 2,392,129 A * | 1/1946 | Downes | ..................... | E04C 2/54 156/107 |
| 2,392,130 A * | 1/1946 | Downes | ................ | B64C 1/1492 52/476 |
| 3,210,808 A | 10/1965 | Creager | | |
| 4,606,162 A | 8/1986 | Wendt | | |
| 4,621,478 A | 11/1986 | Phillips et al. | | |
| 4,663,896 A | 5/1987 | Dunnick | | |
| 4,934,115 A | 6/1990 | Nozaki | | |
| 5,570,971 A * | 11/1996 | Rixen | ................... | E04B 2/7427 52/592.4 |
| 5,911,660 A * | 6/1999 | Watson | ..................... | E06B 9/02 52/586.1 |
| 6,598,361 B2 | 7/2003 | Ting | | |
| 6,689,240 B2 | 2/2004 | Jesse | | |
| 8,316,606 B2 * | 11/2012 | Siewert | ................... | E04F 13/10 52/592.4 |

(Continued)

FOREIGN PATENT DOCUMENTS

| | | |
|---|---|---|
| CN | 110159017 A | 8/2019 |
| CN | 111395615 A | 7/2020 |
| KR | 20090109098 A | 10/2009 |

*Primary Examiner* — Kyle J. Walraed-Sullivan
(74) *Attorney, Agent, or Firm* — CANTOR COLBURN LLP

(57) ABSTRACT

Disclosed herein is a panel assembly configured to form a mullion joint. The panel assembly can comprise a panel composed of a material substrate that, in some examples, can be transparent to radio frequency signals. The panel assembly can further comprise a first bezel configured to frame a perimeter of the panel on a first side of the panel. The panel assembly can comprise a second bezel configured to frame the perimeter of the panel on a second side of the panel opposite of the first side, the second bezel comprising cogs formed on a first edge of the second bezel. The cogs of the second bezel can be configured to receive and join with cogs of a bezel of a second panel assembly to form a mullion joint. The mullion joint can be transparent, opaque, or partially transparent to radio frequency signals and/or visible light.

22 Claims, 9 Drawing Sheets

(56) References Cited

U.S. PATENT DOCUMENTS

| | | | |
|---|---|---|---|
| 8,904,720 B2 | 12/2014 | Woodward et al. | |
| 8,904,954 B2 | 12/2014 | Bruce et al. | |
| 8,944,381 B2 | 2/2015 | Ebner et al. | |
| 9,126,670 B2* | 9/2015 | Thable | B64C 1/069 |
| 2006/0071125 A1* | 4/2006 | Wood | B64C 1/1492 |
| | | | 244/119 |
| 2006/0284016 A1* | 12/2006 | Balsillie | B64C 1/1492 |
| | | | 244/129.3 |
| 2008/0042012 A1* | 2/2008 | Callahan | B64C 1/1492 |
| | | | 359/275 |
| 2009/0134275 A1* | 5/2009 | Hackius | B64C 1/12 |
| | | | 244/117 R |
| 2010/0224729 A1* | 9/2010 | Lieven | F41H 5/263 |
| | | | 244/131 |
| 2013/0212973 A1* | 8/2013 | Saunders | E06B 1/6007 |
| | | | 52/656.5 |
| 2015/0239547 A1* | 8/2015 | Sumner | B64C 1/1492 |
| | | | 244/129.3 |
| 2015/0296565 A1* | 10/2015 | Apdalhaliem | B64C 1/1484 |
| | | | 219/203 |
| 2015/0354790 A1* | 12/2015 | Ash | F21V 14/08 |
| | | | 362/253 |
| 2018/0316365 A1* | 11/2018 | Völkel | H01Q 1/1271 |
| 2019/0226268 A1* | 7/2019 | Luvison | E06B 1/6007 |
| 2020/0123845 A1* | 4/2020 | Busscher | B32B 17/10293 |
| 2021/0119318 A1 | 4/2021 | Hughes et al. | |

* cited by examiner

PANEL ASSEMBLY WITH MULLION JOINT

GOVERNMENT LICENSE RIGHTS

This invention was made with government support under a withheld contract awarded by the Department of Defense. The government has certain rights in the invention.

BACKGROUND

Panels or windows can be used in structures, such as an aircraft, that may be required to withstand substantial pressure differentials during flight and protect the interior of the structure from harsh exterior environments. To satisfy these requirements, conventional panel assemblies have been used that comprise an outboard structural panel mounted on the aircraft's exterior skin. The panel may be rigid and may be covered around the perimeter with thick mechanical supports, clamps, or brackets. Such clamps or brackets may separate two panels and can partially cover both of the panels. The clamps or brackets may therefore restrict light or other signals from passing through the panels. In addition, the clamps or brackets may be required to provide structural rigidity between the two panels.

BRIEF DESCRIPTION OF THE DRAWINGS

Features and advantages of the invention will be apparent from the detailed description which follows, taken in conjunction with the accompanying drawings, which together illustrate, by way of example, features of the invention; and, wherein.

Figure 1A:
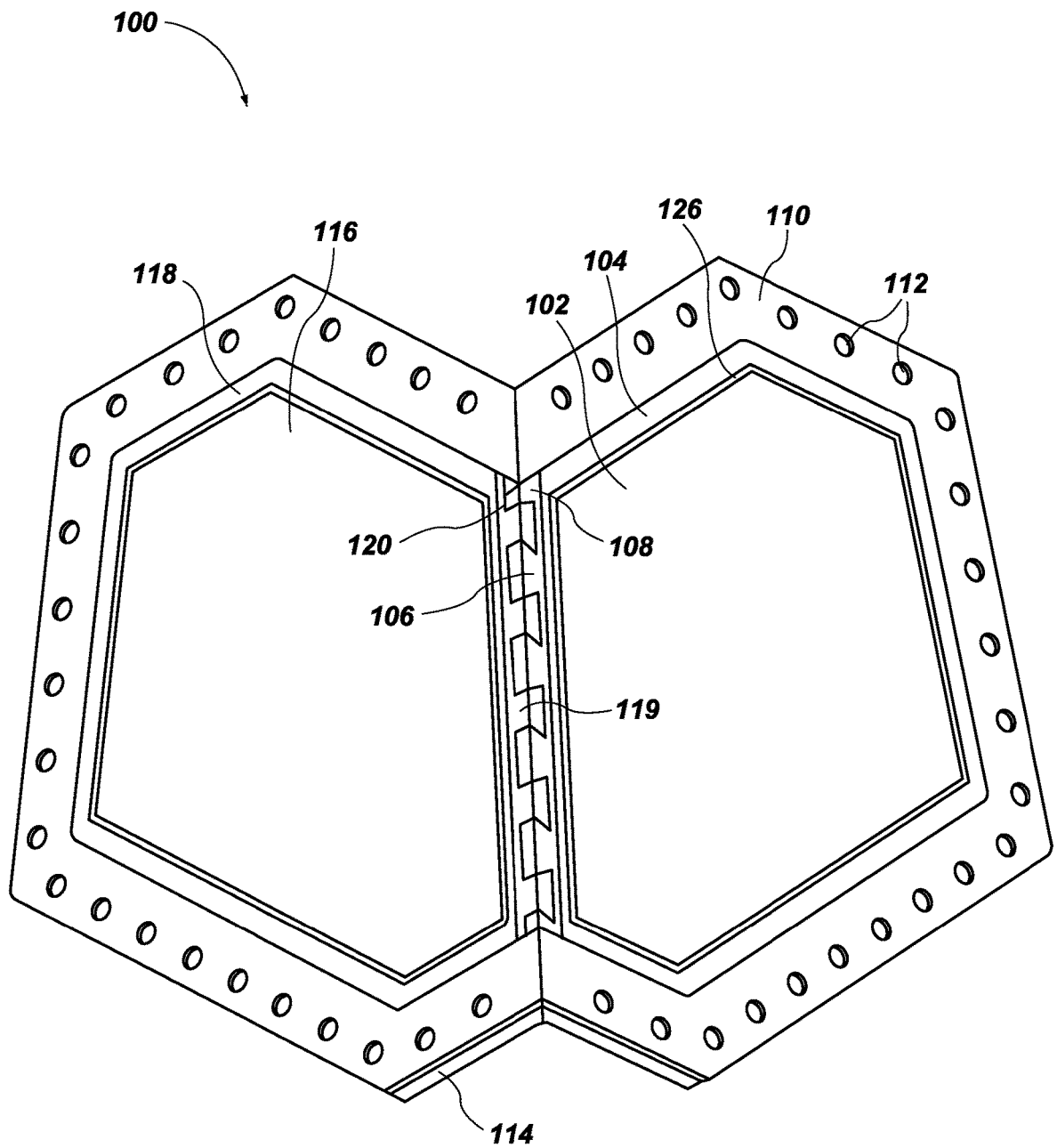
FIG. 1A illustrates a front view of a panel assembly in accordance with an example of the present disclosure.

Reference will now be made to the exemplary embodiments illustrated, and specific language will be used herein to describe the same. It will nevertheless be understood that no limitation of the scope of the invention is thereby intended.

DETAILED DESCRIPTION

As used herein, the term "substantially" refers to the complete or nearly complete extent or degree of an action, characteristic, property, state, structure, item, or result. For example, an object that is "substantially" enclosed would mean that the object is either completely enclosed or nearly completely enclosed. The exact allowable degree of deviation from absolute completeness may in some cases depend on the specific context. However, generally speaking the nearness of completion will be so as to have the same overall result as if absolute and total completion were obtained. The use of "substantially" is equally applicable when used in a negative connotation to refer to the complete or near complete lack of an action, characteristic, property, state, structure, item, or result.

As used herein, "adjacent" refers to the proximity of two structures or elements. Particularly, elements that are identified as being "adjacent" may be either abutting or connected. Such elements may also be near or close to each other without necessarily contacting each other. The exact degree of proximity may in some cases depend on the specific context.

An initial overview of the inventive concepts are provided below and then specific examples are described in further detail later. This initial summary is intended to aid readers in understanding the examples more quickly, but is not intended to identify key features or essential features of the examples, nor is it intended to limit the scope of the claimed subject matter.

Disclosed herein is a panel assembly configured to form a mullion joint. The panel assembly can comprise a panel composed of a material substrate. In one example, this can be transparent to radio frequency signals. The panel assembly can further comprise a first bezel configured to frame a perimeter of the panel on a first side of the panel. The panel assembly can comprise a second bezel configured to frame the perimeter of the panel on a second side of the panel opposite of the first side, the second bezel comprising cogs formed on a first edge of the second bezel. The cogs of the second bezel can be configured to receive and join with cogs of a bezel of a second panel assembly to form a mullion joint. The mullion joint can be transparent to radio frequency signals.

Further disclosed herein is a system of panel assemblies joined together to form a mullion joint. The system of panel assemblies can comprise first panel assembly. The first panel assembly can comprise a first panel composed of a material substrate. In one example, the material substrate can be transparent to radio frequency signals. The first panel assembly can further comprise a first bezel of the first panel assembly configured to frame a perimeter of the first panel on a first side of the first panel. The first panel assembly can further comprise a second bezel of the first panel assembly configured to frame the perimeter of the first panel on a second side of the first panel opposite of the first side, the second bezel of the first panel assembly comprising cogs formed on a first edge. The system of panel assemblies can further comprise a second panel assembly. The second panel assembly can further comprise a second panel composed of a material substrate. In one example, the material substrate of the second panel can be transparent to radio frequency signals. The second panel assembly can further comprise a first bezel of the second panel assembly configured to frame a perimeter of the second panel on a first side of the second panel. The second panel assembly can further comprise a second bezel of the second panel assembly configured to frame the perimeter of the second panel on a second side of the second panel opposite of the first side, the second bezel of the second panel assembly comprising cogs formed on a first edge. The system of panel assemblies can further comprise a mounting structure configured to receive a portion of the second bezel of the first panel assembly, and the second bezel of the second panel assembly. The system of panel assemblies can further comprise a clamping structure configured to cover a portion of the first bezel of the first panel assembly and a portion of the first bezel of the second panel assembly, wherein a portion of the perimeter of the first panel and a portion of the second panel is sandwiched between the mounting structure and the clamping structure. The cogs of the second bezel of the first panel assembly can be configured to receive and join with cogs of the second bezel of the second panel assembly to form a mullion joint. In one example, the mullion joint can be transparent to radio frequency signals. In another example, the mullion joint can be opaque to radio frequency signals. In still another example, the mullion joint can permit a degree of radio frequency signals therethrough, the mullion joint be somewhere between fully transparent and opaque to radio frequency signals. The mullion joint can extend between an opening in the mounting structure and an opening in the clamping structure.

Further disclosed herein is a method for configuring a system of panel assemblies with a mullion joint. The method can comprise forming a first panel for a first panel assembly composed of a material substrate. In one example, the material substrate can be transparent to radio frequency signals. The method can further comprise forming a first bezel of the first panel assembly formed to frame a perimeter of the first panel on a first side of the first panel. The method can further comprise forming a second bezel of the first panel assembly formed to frame the perimeter of the first panel on a second side of the first panel opposite of the first side, the second bezel of the first panel assembly comprising cogs formed on a first edge. The method can further comprise joining the cogs of the second bezel of the first panel assembly to cogs of a second bezel of a second panel assembly wherein the cogs are formed to receive and join together to form a mullion joint. In some examples, the mullion joint can be transparent to radio frequency signals.

Embodiments of the present technology can include a panel assembly or a system of panel assemblies that join together to form a mullion joint. The panel assemblies can be installed on structures such as aircraft, buildings, vehicles, spacecraft, radar structures, etc. A panel associated with a panel assembly can be composed of a substrate or material substrate. In one example, the material substrate can be transparent to radio frequency signals. In another example, the material substrate can be opaque to radio frequency signals. The panel can be transparent, opaque or partially transparent with respect to visible light. For example, the system of panel assemblies can be installed on an exterior of an aircraft such that radio frequency signals can pass through one or more panels to be received by a sensor housed in the aircraft. The system of panel assemblies can be designed and constructed to withstand rigorous environmental conditions when installed and employed on the exterior of an aircraft. Embodiments of the present technology can employ cogs to mate two panels together along an edge to form a mullion joint. The cogs can be formed in dovetail shapes or other shapes. The mullion joint can be formed in bezels that surround a perimeter of the panels or the mullion joint can be formed in the panels themselves. The other edges of the panels that do not form the mullion joint can be mounted into the structure, such as an aircraft, using a mounting structure and a clamp. The mullion joint may not be covered by the mounting structure and clamp. In one example, the mullion joint may be thinner than a thickness of the mounting structure and clamp. In one example, the mullion joint has a thickness that is at least one of thicker than the panel, the same as the panel, or thinner than the panel. The mounting structure and clamp may or may not be transparent to radio frequency signals. The mullion joint can be transparent or opaque to radio frequency signals. The mullion joint can be transparent, opaque, or partially transparent with respect to visible light. The mullion joint can also maintain electrical and thermal conductivity between the panels. The mullion joint can be formed with cooling channels in the cogs.

To further describe the present technology, examples are now provided with reference to the figures. With reference to FIG. 1A, illustrated is a system of panel assemblies 100 in accordance with an example of the present disclosure. The system of panel assemblies 100 can be configured to join two or more panel assemblies. As shown, the system of panel assemblies 100 can comprise a first panel assembly and a second panel assembly. The first panel assembly can include a first panel 102, a first bezel 104, cogs 106, and a second bezel 108. The second panel assembly can include a second panel 116, a first bezel 118, cogs 119, and a second bezel 120. It should be appreciated that the first and second panel assemblies can have the same or different features and components as compared to one another. The system of panel assemblies 100 also depicts a mounting structure 114, a clamping structure 110, fasteners 112, and an optional conductive bond 126.

The example panel 102 is depicted as being a substantially planar shape with six sides. However, it should be appreciated that the panel 102 can be formed in any shape with any number of sides and can be substantially planar or flat. The panel can also be concave or convex. The panel 102 can be composed of a substrate that is transparent or opaque to radio frequency signals, wherein being transparent to radio frequency signals means that radio frequency signals can pass through the panel 102, and wherein being opaque to radio frequency signals means that radio frequency signals are unable to pass through the panel 102. The panel 102 can be transparent, opaque, or partially transparent to visible light. As examples, but not being limited to these, the panel 102 can be composed of glass, metal, a composite, a polymer, or any other suitable material. In one example, the panel 102 can be referred to as a window or a window pane and can be transparent to visible light, such that the panel is transparent to the human eye. In another example, the panel 102 can be opaque. In another example, the panel 102 can be somewhere between transparent and opaque. In another example, the panel 102 can be translucent. Embodiments of the present technology can include any number of panels that form mullion joints with one another. For example, a panel may be joined to one other panel, or more than one other panel. A structure may include more than one system of panel assemblies installed on the structure.

Figure 1B:
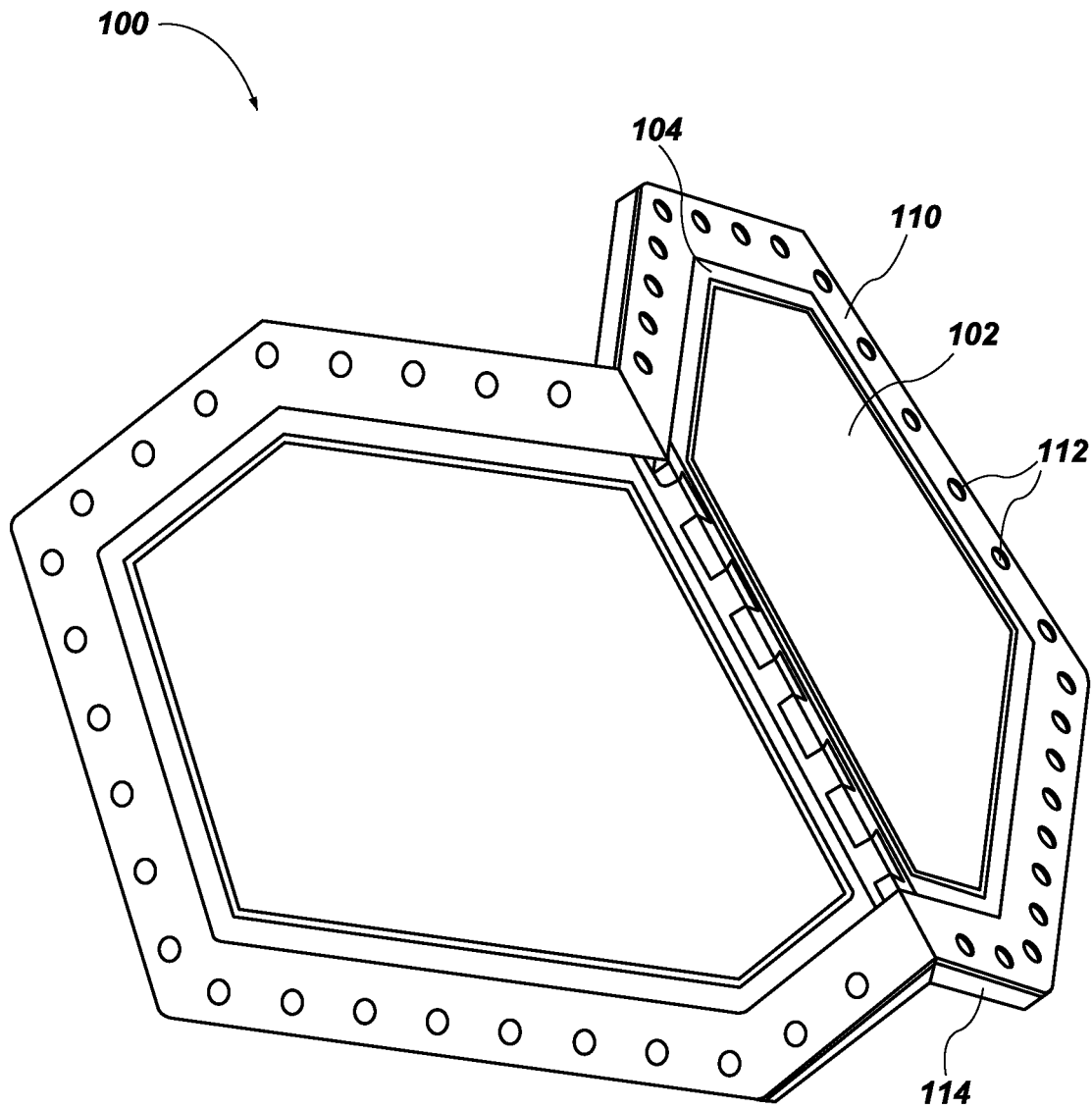
FIG. 1B illustrates an isometric view of the panel assembly of FIG. 1A.
Figure 1C:
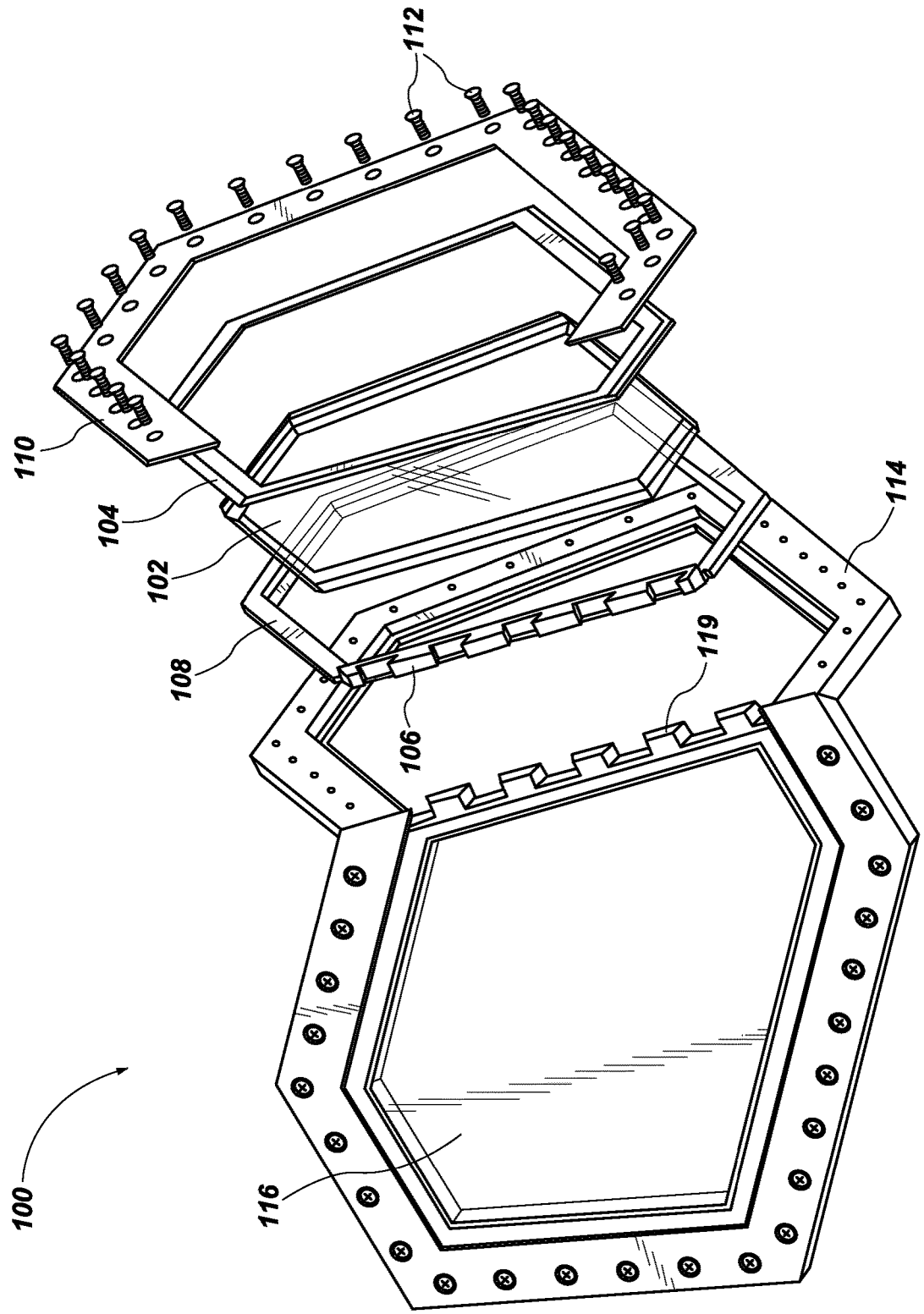
FIG. 1C illustrates an exploded view of the panel assembly of FIG. 1A.

FIG. 1B depicts an isometric or three dimensional view of the system of panel assemblies 100 in accordance with an example of the present disclosure. FIG. 10 depicts an exploded view of the system of panel assemblies 100 in accordance with an example of the present disclosure. With reference to FIGS. 1A-FIG. 10, the first bezel 104 can be configured to frame a perimeter of the panel 102. The first bezel 104 can be formed to follow the contours of the perimeter of the panel 102. The first bezel 104 can partially cover the edges of the panel 102 on one side of the panel 102. The first bezel 104 can extend beyond the edges of the panel 102. The second bezel 108 can be configured to frame a perimeter of the panel 102 on a side of the panel 102 opposite of the side in contact with the first bezel 104. The first bezel 104 and the second bezel 108 can be described as sandwiching the panel 102 around the perimeter of the panel 102. The second bezel 108 can be formed to follow the contours of the perimeter of the panel 102. The second bezel 108 can partially cover the edges of the panel 102 on one side of the panel 102. The second bezel 108 can extend beyond the edges of the panel 102.

The second bezel 108 can be formed with cogs 106 along an edge of the second bezel 108. The cogs 106 can be formed in a shape that is designed to receive and join with the cogs of another second bezel of another panel such as the cogs 119 of second bezel 120 of the panel 116. The cogs of the two bezels can be joined together to form a mullion joint (e.g., see FIGS. 1A and 1B with the cogs 106, 119 joined). The cogs of two bezels associated with two different panels joining to one another can be referred to as a mating interface. The second bezel 108 and the second bezel 120 can join the panel 102 and the panel 116 to one another without using fasteners or adhesives and may be joined to one another without the use of tools. The cogs 106, 119 can be formed in any shape. For example, the cogs 106, 119 can be formed in shapes suitable for dovetail type joinery. The shapes can be rounded or squared or can resemble other patterns such as trapezoids or zig-zags. The cogs 106, 119 can also be shaped in a tongue and groove manner along a length of the respective bezel. The panel 102 and the panel 116 can be installed in a structure such that the panel 102 and the panel 116 are in the same plane as one another or in different planes that form an angle relative to one another as is depicted in the system of panel assemblies 100. By forming the system of panel assemblies with the panel 102 and the panel 116 in planes that are angled to one another, this allow the system of panel assemblies to follow the contours of the structure in which panels are employed. The first bezel 104 can be referred to as an upper bezel that is closer to the exterior of the structure in which the first panel assembly is installed. The second bezel 108 can be referred to as the lower bezel that is closer to the interior of the structure in which the first panel is installed.

The first bezel 104 and the second bezel 108 of the first panel assembly can be formed of the same or different materials including metallic or composite based materials. The first bezel 104 and the second bezel 108 may not be rigid and can be formed of material that provides some flexibility to the mullion joint. The same is true for the first and second bezels of the second panel assembly.

The panel 102 of the first panel assembly and the panel 116 of the second panel assembly may be installed relative to one another on any angle. In one example, the panels 102, 116 can be installed relative to one another in a range of angles between 0 and 180 degrees; between 0 and 170 degrees; between 0 and 160 degrees; between 0 and 150 degrees; between 0 and 140 degrees; between 0 and 130 degrees; between 0 and 120 degrees; between 0 and 110 degrees; between 0 and 100 degrees; between 0 and 90 degrees, between 0 and 70 degrees; between 0 and 45 degrees; between 0 and 30 degrees, and any others. The cogs of the second bezel 108 of the first panel assembly and the cogs of the second bezel 120 of the second panel assembly can allow the panel 102 and the panel 116 to flex in position relative to one another after installation. The degree of flexibility can depend upon the materials and configuration of the panel assembly 100. The flexibility of the mullion joint can be referred to as semi-independent window sub-assembly flexure along the mullion length.

The panel 102 with the first bezel 104 and the second bezel 108 can be installed or mounted onto a structure via a mounting structure 114, a clamping structure 110, and fastening means, such as fasteners 112. For example, the mounting structure 114 may be part of the structure in which the panel assembly is being installed. The mounting structure 114 can be an opening in the exterior of the structure. The mounting structure 114 can be part of the structure or can be a bracket installed onto the structure. The mounting structure 114 can be configured to receive a surface of the second bezel 108 with panel assembly and the first bezel 104. A clamping structure 110 can be installed at least partially over the first bezel 104 to sandwich the panel 102 between the first bezel 104 and the second bezel 108 while the first bezel 104 and the second bezel 108 are sandwiched between the mounting structure 114 and the clamping structure 110. The clamping structure 110 can be secured to the mounting structure 114 via one or more fastening means, such as fasteners 112. The fasteners 112 can be screws bolts or other suitable fasteners. The fasteners 112 may or may not pass through the first bezel 104, the second bezel 108, and the panel 102.

The mounting structure 114 and the clamping structure 110 may form a frame around the perimeter of the panel 102, but not on any side of the panel 102 that forms a mullion joint with another panel, such as the panel 116 of the second panel assembly. For example, the mounting structure 114 and the clamping structure 110 may not be framed or formed around the side of the panel 102 that is joined to the panel 116 via the second bezel 108 of the first panel assembly and the second bezel 120 of the second panel assembly. Thus, the mounting structure 114 and the clamping structure 110 may not cover the mullion joint. The mullion joint can be described as extending across the opening in the structure that is framed by the mounting structure 114 and the clamping structure 110.

The components forming the mullion joint, such as the second bezel 108 and cogs 106 of the first panel assembly and the second bezel 120 and cogs 119 of the second panel assembly, can be at least one of transparent or opaque to radio frequency signals, and in other examples, can be one of transparent, opaque, or partially transparent to visible light. In the case of a transparent panel assembly, a sensor configured to receive radio frequency signals that is placed behind the mullion joint can receive radio frequency signals through the mullion joint. Conversely, in some examples, the radio frequency signals may not pass through the clamping structure 110 and mounting structure 114. Some prior solutions to joining two panels together do not employ a mullion joint and instead may surround all sides of the perimeter of each panel with the mounting structure and the clamping structure such that radio frequency signals may not pass through a joint formed by the mounting structure and the clamping structure. Therefore, the system of panel assemblies 100 of the present technology with mullion joints can have advantages over such prior designs, such as a larger substrate open as compared to such prior solutions that have panels of the same size with no mullion joint.

Additionally, in some examples of the present technology, the mullion joint of the system of panel assemblies 100 can also be thinner than a prior joint that employs a mounting structure and clamping structure around all sides of the panels. The mullion joint, as it is not formed of the clamping and mounting structures, and as it is thinner than other prior solutions, can allow more light to pass through the panels as so configured to be transparent. Moreover, the mullion joint can have a thickness that is at least one of thicker than either of the panels 102 and 116, the same as either of the panels 102 and 116, or thinner than either of the panels 102 and 116. The system of panel assemblies 100 can allow for independent panel attachment and replacement in compound window assemblies. While a mullion joint of the present technology can be thinner than a prior joint that employs a mounting structure and clamping structure or other brackets around all sides of the panels, the mullion joint of the present technology is structured to provide the structural integrity for a panel joint in use in harsh environments, and on structures that may be used within such environments, such as an aircraft.

The system of panel assemblies 100 depicts two panel assemblies and two panels (e.g., panel 102 and panel 116) joined together with one mullion joint. Examples of the present technology can employ three or four panels, or any other number of panels, that can be connected to one another via multiple similarly configured and functional mullion joints that, in some examples, can be radio transparent while the exterior sides of the panels not joined to other panels can be framed by a mounting structure 114 and clamping structure 110.

Figure 1D:
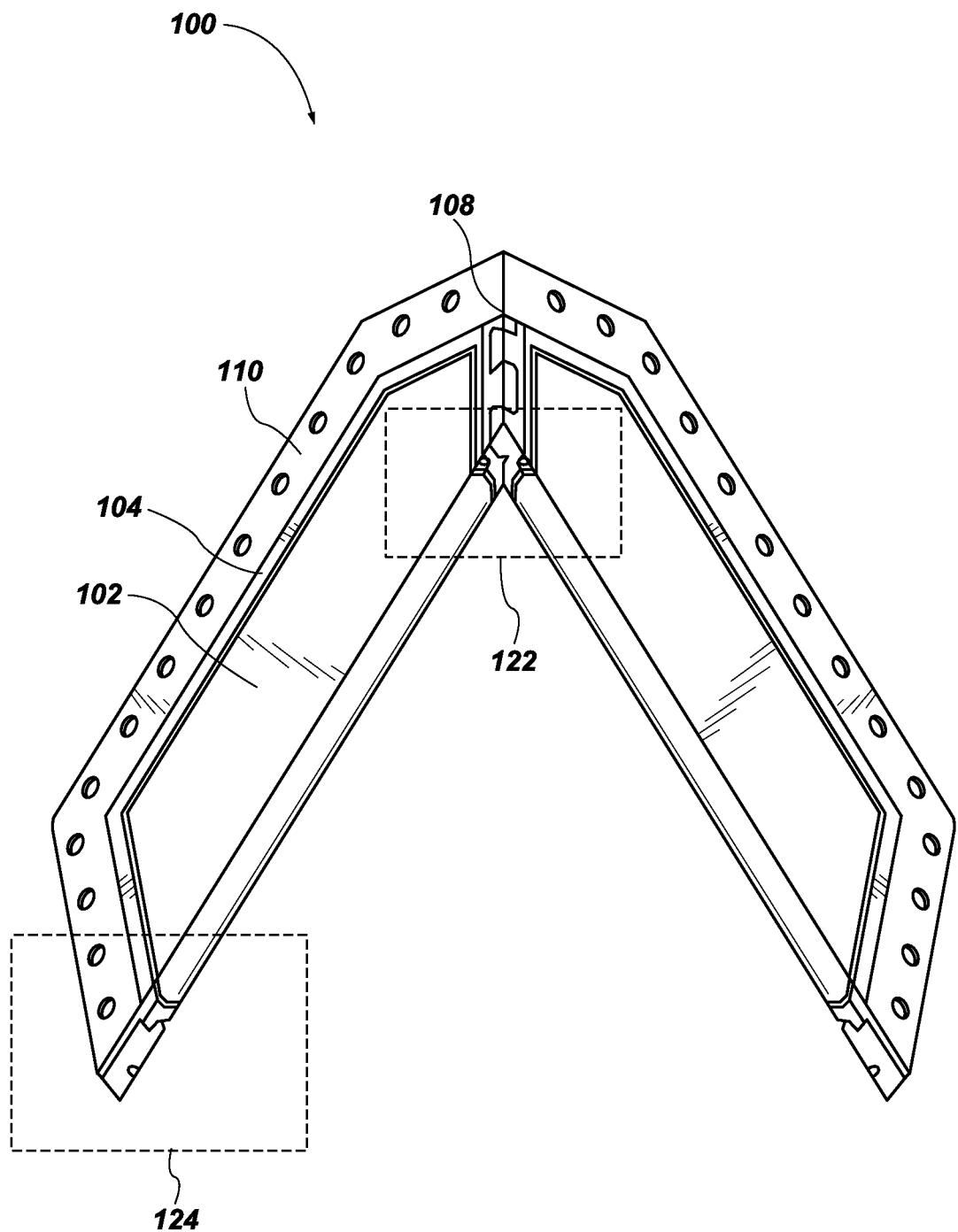
FIG. 1D illustrates a cross section view of the panel assembly of FIG. 1A.
Figure 1E:
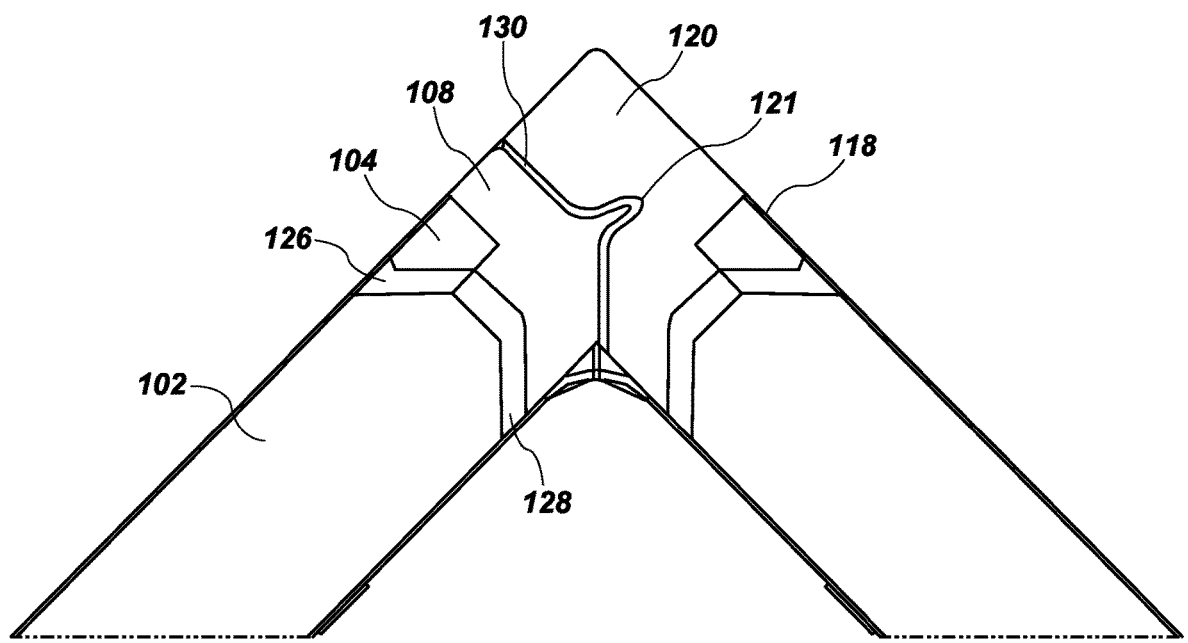
FIG. 1E illustrates an enlarged cross section view of a first viewing pane shown in FIG. 1D.

FIG. 1D depicts a cross section view of the system of panel assemblies 100. The cross section view is shown with viewing pane 122 and viewing pane 124 delineated. FIG. 1E depicts a detailed view of the components of the system of panel assemblies 100 within the viewing pane 122, and depicts a detailed cross-section view of a mullion joint in accordance with examples of the present technology. The second bezel 108 of the first panel assembly is depicted as joining with the second bezel 120 of the second panel assembly using a tongue and groove shape 121. The second bezel 108 of the first panel assembly can be in direct contact with the second bezel 120 of the second panel assembly and may be joined without a bonding material. In one example, the second bezel 108 of the first panel assembly can be joined to the second bezel 120 of the second panel assembly via a bonding material 130. The bonding material 130 can be, but is not limited to a gasket, an adhesive, an elastomer material, an epoxy material, or others as will be appreciated by those skilled in the art. The second bezel 108 of the first panel assembly and the second bezel 120 of the second panel assembly can maintain electrical connectivity and thermal connectivity with one another via direct contact or via the bonding material 130. The bonding material 130 can be composed of particles that enhance or maintain electrical and thermal connectivity. For example, the bonding material 130 can contain particles of silver or other electrically conductive materials. In one example, the bonding material 130 can comprise a silver raised elastomeric epoxy. In another example, the bonding material 130 can comprise a gasket composed of conductive materials. The bonding material 130 can have flexibility that allows the mullion joint to maintain the flexibility provided by the flexible nature of the bezels forming the mullion joint.

FIG. 1E depicts the system of panel assemblies 100 with a conductive bond 126 and a structural bond 128. The conductive bond 126 and the structural bond 128 are optional components. The conductive bond 126 can be used to join the panel 102 to the first bezel 104 of the first panel assembly. The conductive bond 126 can be an adhesive material or another bonding material, such as an epoxy or elastomer and can have conductive properties that allow the panel 102 to be in electrical and thermal connectivity with the first bezel 104. The structural bond 128 can be used to join the panel 102 to the second bezel 108 of the first panel assembly. The structural bond 128 can be a bonding material such as an adhesive, an epoxy or an elastomer that provides structural strength to the bond.

Figure 1F:
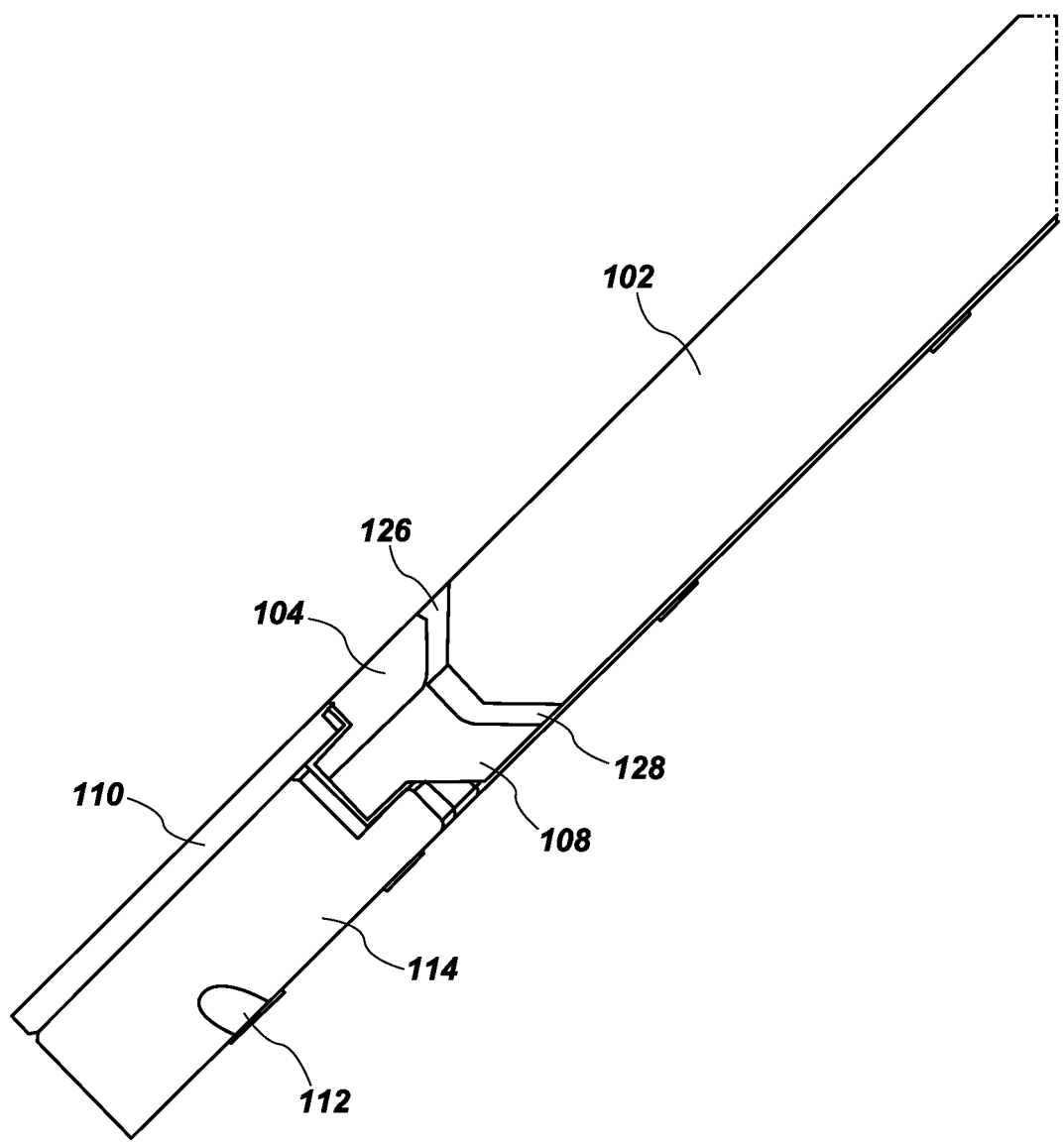
FIG. 1F illustrates an enlarged cross section view of a second viewing pane shown in FIG. 1D.

FIG. 1F depicts an enlarged view of the viewing pane 124 of FIG. 1D, and depicts a detailed cross-section view of the first panel assembly and of the panel 102 with the first bezel 104 and the second bezel 108 sandwiched between the mounting structure 114 and the clamping structure 110. The clamping structure 110 is depicted as partially covering the first bezel 104 while a portion of the first bezel 104 is exposed to the exterior of the system of panel assemblies 100. The mounting structure 114 is depicted as partially covering the second bezel 108 while a portion of the second bezel 108 is exposed to the interior of the system of panel assemblies 100. The panel 102 is depicted with a shaped edge that is configured to be partially covered by the first bezel 104 above and the second bezel 108 below.

Figure 1G:
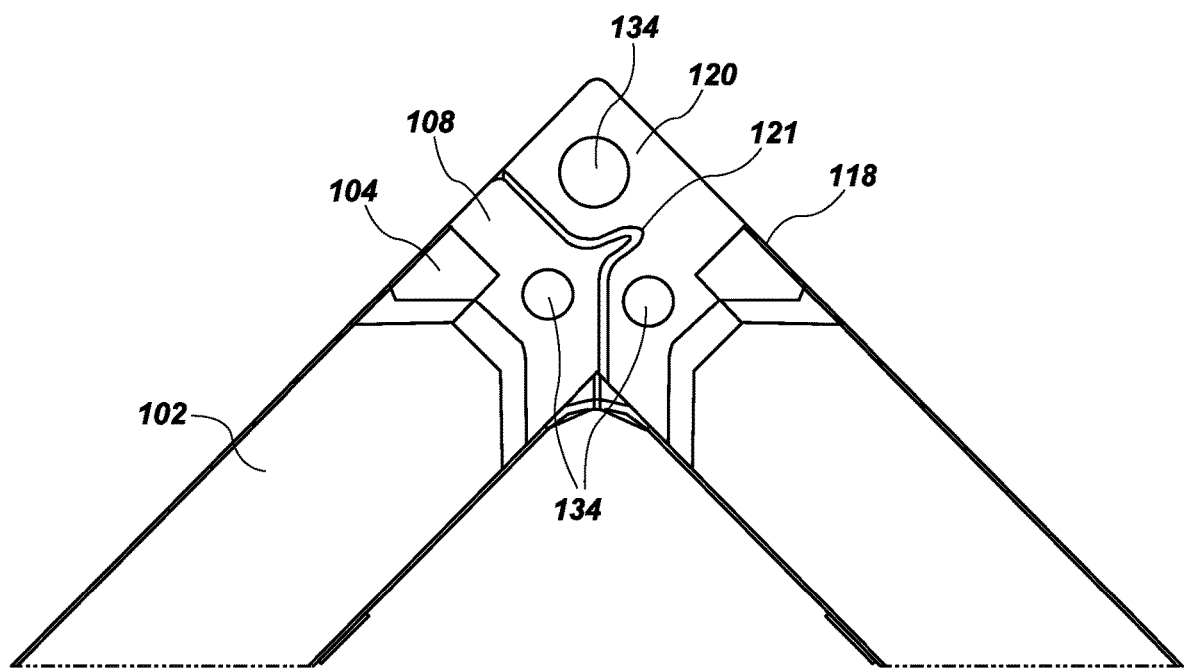
FIG. 1G illustrates an enlarged cross section view of the first viewing pane of FIG. 1D with cooling channels in accordance with an example of the present disclosure.

FIG. 1G depicts an enlarged view of the viewing pane 122 of FIG. 1D, and depicts a detailed cross-section view of an example mullion joint with cooling channels 134 as part of a cooling system, in accordance with examples of the present technology. With reference to FIGS. 1A-1G, in one example, the cooling channels 134 can comprise openings in the mullion joint that allow for cooling of the mullion joint and the system of panel assemblies 100. The cooling channels 134 can be located in at least one of the second bezel 108 of the first panel assembly, or the second bezel 120 of the second panel assembly. The cooling channels 134 can be configured to run in one or more directions, and can be positioned in any position, such as in a position adjacent to the cogs 106, 119. The cooling channels 134 can have a tubular or tunnel shape or any other suitable shape and can have one or more entry and exit points. In one example, the cooling channels 134 can allow air to pass through the channels or tubes and exit out of the mullion joint. The passing air can facilitate the escape of heat from the mullion joint. The air can be passive or naturally aspirated. Alternatively, the cooling system can further comprise an active cooling system configured to force air through the cooling channels 134, such as via one or more fans. In another example, the cooling system can comprise an active cooling system, wherein the cooling channels 134 can be filled with a recirculating liquid or fluid to transfer heat out of the mullion joint. The fluid can be pumped through the cooling channels 134 via a pump with a reservoir and can be connected to an optional radiator with cooling fins. In another example, the cooling channels 134 can be filled with a phase change material.

Figure 2:
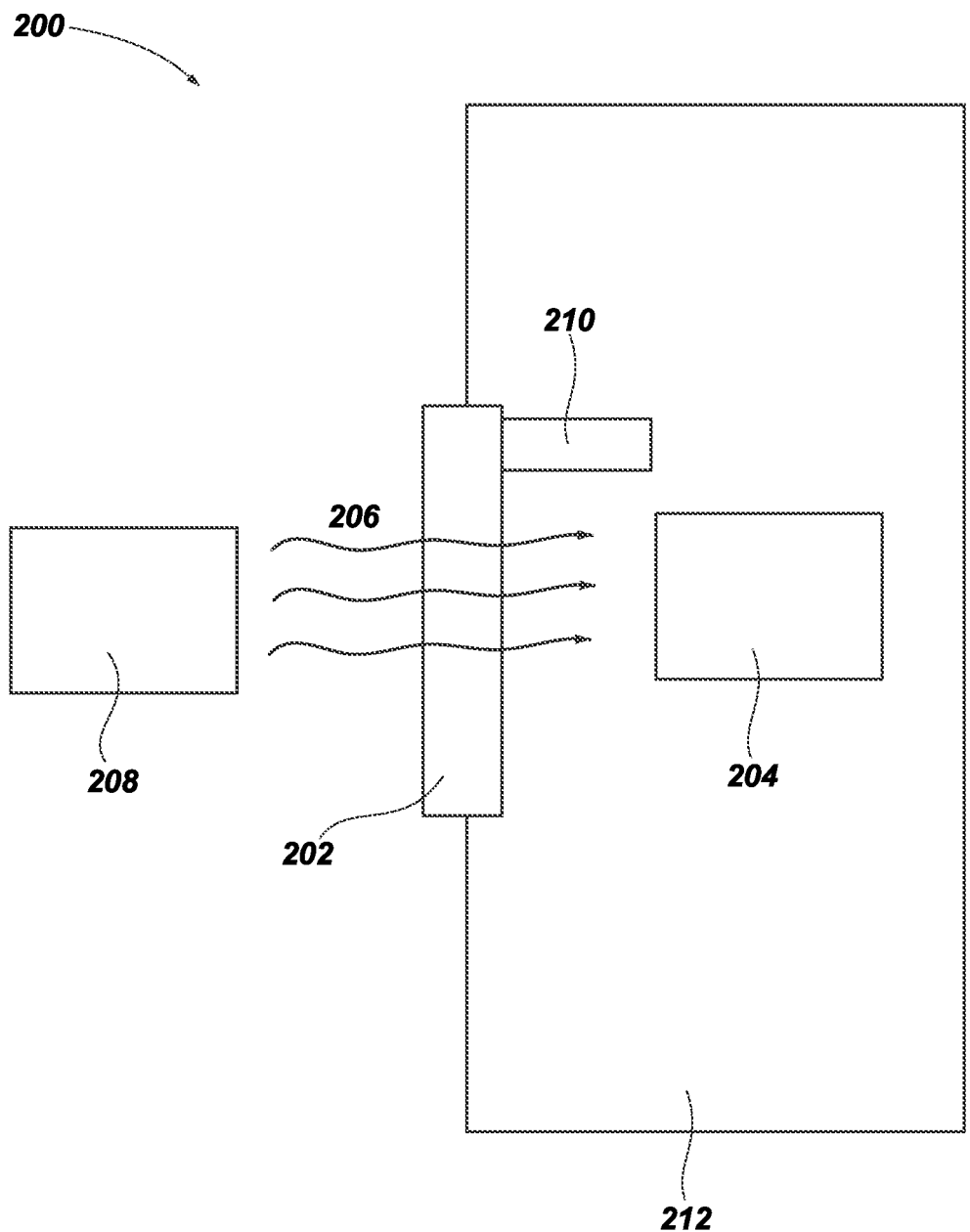
FIG. 2 illustrates a flowchart of an example method 200 for configuring a system of panel assemblies with a mullion joint according to an example of the present technology.

With reference to FIG. 2, illustrated is an environment 200 in accordance with an example of the present disclosure. The environment 200 depicts a system of panel assemblies 202 with at least two panels joined together via a mullion joint of the present technology, as taught herein. A structure 212 can be an aircraft, vehicle, building, housing, or other structure. The system of panel assemblies 202 can be installed onto the structure 212 over or in an opening in the exterior of the structure 212. The panels of the system of panel assemblies 202 can be at least one of transparent or opaque to radio frequency signals, and in some other examples, may be transparent, opaque, or partially transparent to visible or other light. A mullion joint of the system of panel assemblies 202 can be at least one of transparent or opaque to radio frequency signals. The radio frequency signals and the light are depicted as rays 206. The rays 206 can originate from object 208. The object 208 can be a light source, a radio transmitter, a physical object that reflects or originates light or signals, etc. In the case of a transparent or partially transparent system of panel assemblies 202, the rays 206 can pass through the system of panel assemblies 202 and impinge upon a sensor 204 that is housed in the structure 212. The sensor 204 can be a camera, an infrared sensor, a radio transceiver, a motion sensor, a light sensor, or other sensor.

The system of panel assemblies 202 can have an optional cooling system 210. The cooling system 210 can comprise or be associated with cooling channels, such as the cooling channels 134 of FIG. 1G. In one example, the cooling system can comprise a passive cooling system. In another example, the cooling system 210 can be associated with a cooling system that can employ one or more fans to force air, liquid or a phase change material through cooling channels. In another example, the cooling system 210 can be associated with a fluid cooling system that employs a cooling fluid, fluid pumps, a fluid reservoir, and an optional radiator.

Figure 3:
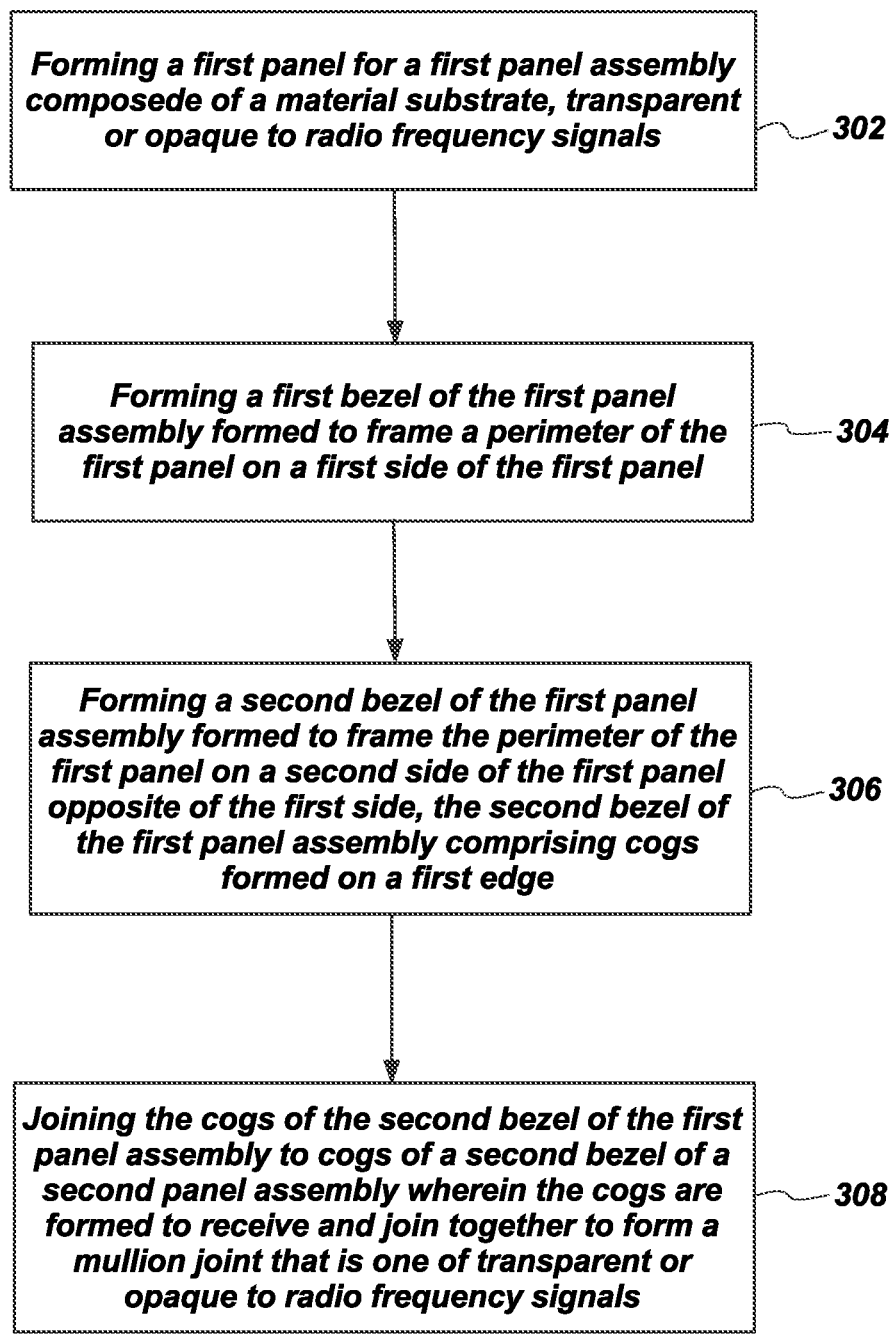
FIG. 3 illustrates a block diagram of a system of panel assemblies in an environment according to an example of the present technology.

FIG. 3 is a flowchart of an example method 300 for configuring a system of panel assemblies with a mullion joint according to an example of the present technology, which method can incorporate any combination of the teachings above as discussed with reference to FIGS. 1A-2. The method can include forming 302 a first panel for a first panel assembly composed of a material substrate, which in some examples can be transparent to radio frequency signals (one in other examples, opaque or partially transparent). The method can further include forming 304 a first bezel of the first panel assembly configured and operable to frame a perimeter of the first panel on a first side of the first panel. The method can further include forming a second bezel of the first panel assembly configured and operable to frame the perimeter of the first panel on a second side of the first panel opposite of the first side, the second bezel of the first panel assembly comprising cogs formed on a first edge. The method can further include joining 308 the cogs of the second bezel of the first panel assembly to cogs of a second bezel of a second panel assembly, wherein the cogs are formed to receive and join together to form a mullion joint. In some examples, the mullion joint can be transparent to radio frequency signals. In other examples, the mullion joint can be opaque or partially transparent to visible light and/or radio frequency signals.

In one example, the method can further comprise configuring the system of panel assemblies with a cooling system, which can include forming cooling channels within and throughout the mullion joint that are configured to be filled with at least one of air, a liquid or a phase change material.

In one example, the method can further comprise configuring the cooling system to comprise an active cooling system operable to force at least one of air or fluid or a phase change material through the cooling channels.

While the examples described herein have been mostly directed to a panel assembly, the principles described herein may also be applied to a system for panel assemblies and a method for configuring a system of panel assemblies and vice versa. Furthermore, examples described herein primarily describe two panels or windows connected by one mullion joint. It should be appreciated that the present technology may be employed with any number of panels connected via any number of mullion joints.

Reference was made to the examples illustrated in the drawings and specific language was used herein to describe the same. It will nevertheless be understood that no limitation of the scope of the technology is thereby intended. Alterations and further modifications of the features illustrated herein and additional applications of the examples as illustrated herein are to be considered within the scope of the description.

Although the disclosure may not expressly disclose that some embodiments or features described herein may be combined with other embodiments or features described herein, this disclosure should be read to describe any such combinations that would be practicable by one of ordinary skill in the art. The use of "or" in this disclosure should be understood to mean non-exclusive or, i.e., "and/or," unless otherwise indicated herein.

Furthermore, the described features, structures, or characteristics may be combined in any suitable manner in one or more examples. In the preceding description, numerous specific details were provided, such as examples of various configurations to provide a thorough understanding of examples of the described technology. It will be recognized, however, that the technology may be practiced without one or more of the specific details, or with other methods, components, devices, etc. In other instances, well-known structures or operations are not shown or described in detail to avoid obscuring aspects of the technology.

Although the subject matter has been described in language specific to structural features and/or operations, it is to be understood that the subject matter defined in the appended claims is not necessarily limited to the specific features and operations described above. Rather, the specific features and acts described above are disclosed as example forms of implementing the claims. Numerous modifications and alternative arrangements may be devised without departing from the spirit and scope of the described technology.

What is claimed is:

1. A panel assembly configured to form a mullion joint, the panel assembly comprising:
   a panel composed of a material substrate;
   a first bezel configured to frame a perimeter of the panel on a first side of the panel;
   a second bezel configured to frame the perimeter of the panel on a second side of the panel opposite of the first side, the second bezel comprising cogs formed on a first edge of the second bezel,
   wherein the cogs of the second bezel are configured to receive and join with cogs of a bezel of a second panel assembly to form a mullion joint; and
   a bonding material for joining the second bezel of the panel assembly to the bezel of the second panel assembly at the mullion joint, wherein the bonding material maintains an electrical connectivity and a thermal conductivity between the panel assembly and the second panel assembly.

2. The panel assembly of claim 1, wherein the mullion joint is transparent to radio frequency signals.

3. The panel assembly of claim 1, wherein the panel is formed in a flat plane.

4. The panel assembly of claim 1, wherein the bonding material is a gasket, an adhesive, an elastomer material, or an epoxy material.

5. The panel assembly of claim 1, wherein the cogs form cooling channels throughout the mullion joint.

6. The panel assembly of claim 5, wherein the cooling channels are filled with at least one of air, a liquid, or a phase change material.

7. The panel assembly of claim 1, wherein the panel is a window pane that is transparent to visible light or RF frequencies.

8. The panel assembly of claim 1, wherein the mullion joint is formed at an angle between the panel assembly and the second panel assembly and allows for a degree of independent flexibility of the panel assembly and the second panel assembly relative to one another.

9. The panel assembly of claim 1, wherein the second bezel further comprises a second edge formed with cogs configured to receive and join with cogs of a third panel to form a second mullion joint.

10. The panel assembly of claim 1, wherein the cogs form a dovetail pattern.

11. The panel assembly of claim 1, further comprising:
a mounting structure configured to receive a portion of the second bezel of the panel, and the bezel of the second panel assembly; and
a clamping structure configured to cover a portion of the first bezel, wherein a portion of the perimeter of the panel is sandwiched between the mounting structure and the clamping structure, and
wherein the mullion joint extends between an opening in the mounting structure and an opening in the clamping structure, but is not covered by the mounting structure and the clamping structure.

12. The panel assembly of claim 1, wherein the mullion joint has a thickness that is one of thicker than the panel, the same as the panel, or thinner than the panel.

13. A system of panel assemblies joined together to form a mullion joint, the system comprising:
a first panel assembly comprising:
a first panel composed of a material substrate;
a first bezel of the first panel assembly configured to frame a perimeter of the first panel on a first side of the first panel; and
a second bezel of the first panel assembly configured to frame the perimeter of the first panel on a second side of the first panel opposite of the first side, the second bezel of the first panel assembly comprising cogs formed on a first edge;
a second panel assembly comprising:
a second panel composed of a material substrate;
a first bezel of the second panel assembly configured to frame a perimeter of the second panel on a first side of the second panel; and
a second bezel of the second panel assembly configured to frame the perimeter of the second panel on a second side of the second panel opposite of the first side, the second bezel of the second panel assembly comprising cogs formed on a first edge;
a mounting structure configured to receive a portion of the second bezel of the first panel assembly, and the second bezel of the second panel assembly; and
a clamping structure configured to cover a portion of the first bezel of the first panel assembly and a portion of the first bezel of the second panel assembly, wherein a portion of the perimeter of the first panel and a portion of the second panel is sandwiched between the mounting structure and the clamping structure,
wherein the cogs of the second bezel of the first panel assembly are configured to receive and join with cogs of the second bezel of the second panel assembly to form a mullion joint, and
wherein the mullion joint extends between an opening in the mounting structure and an opening in the clamping structure.

14. The system of claim 13, wherein the mullion joint is transparent to radio frequency signals.

15. The system of claim 13, wherein the mullion joint is not covered by the mounting structure or the clamping structure.

16. The system of claim 13, wherein an electrical connectivity and a thermal conductivity is maintained between the first panel assembly and the second panel assembly.

17. The system of claim 13, wherein the cogs form cooling channels throughout the mullion joint.

18. The system of claim 17, wherein the cooling channels are filled with air or a liquid.

19. A method for configuring a system of panel assemblies with a mullion joint, comprising:
forming a first panel for a first panel assembly composed of a material substrate;
forming a first bezel of the first panel assembly formed to frame a perimeter of the first panel on a first side of the first panel;
forming a second bezel of the first panel assembly formed to frame the perimeter of the first panel on a second side of the first panel opposite of the first side, the second bezel of the first panel assembly comprising cogs formed on a first edge;
joining the cogs of the second bezel of the first panel assembly to cogs of a second bezel of a second panel assembly wherein the cogs are formed to receive and join together to form a mullion joint; and
joining the second bezel of the panel assembly to the bezel of the second panel assembly at the mullion joint with a bonding material, wherein the bonding material maintains an electrical connectivity and a thermal conductivity between the panel assembly and the second panel assembly.

20. The method of claim 19, wherein forming the first and second panels comprises forming the first and second panels composed of a material substrate transparent to radio frequency signals, and wherein the mullion joint is transparent to radio frequency signals.

21. The method of claim 19, wherein the cogs of the second bezel of the first panel assembly and the cogs of the second bezel of the second panel assembly form cooling channels throughout the mullion joint that are filled with at least one of air, a liquid or a phase change material.

22. A panel assembly configured to form a mullion joint, the panel assembly comprising:
a panel composed of a material substrate;
a first bezel configured to frame a perimeter of the panel on a first side of the panel;
a second bezel configured to frame the perimeter of the panel on a second side of the panel opposite of the first side, the second bezel comprising cogs formed on a first edge of the second bezel, wherein the cogs of the second bezel are configured to receive and join with cogs of a bezel of a second panel assembly to form a mullion joint;
a mounting structure configured to receive a portion of the second bezel of the panel, and the bezel of the second panel assembly; and
a clamping structure configured to cover a portion of the first bezel, wherein a portion of the perimeter of the panel is sandwiched between the mounting structure and the clamping structure, and wherein the mullion joint extends between an opening in the mounting structure and an opening in the clamping structure, but is not covered by the mounting structure and the clamping structure.

* * * * *